Patented Sept. 16, 1941

2,256,403

UNITED STATES PATENT OFFICE 2,256,403

ACRIDINE COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application June 13, 1940, Serial No. 340,365

11 Claims.  (Cl. 260—279)

This invention relates to acridine compounds and to materials colored therewith. More particularly, it relates to 3,6-diaminoacridine compounds having at least one of the amino group hydrogens substituted by a group having the general formula:

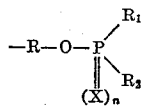

wherein $n$ represents zero or the numeral 1, R represents an alkylene group, $R_1$ and $R_2$ each represents an amino group, an alkylamino group, and the group —OZ, wherein Z represents a member selected from the group consisting of hydrogen, an alkyl group, and an alkali forming metal, and X represents a member selected from the group consisting of an atom of oxygen, and an atom of sulphur.

Still more particularly, the acridine compounds of our invention may be illustrated by the general formula:

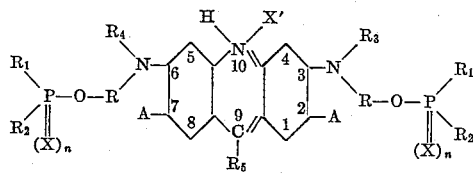

wherein $n$, R, $R_1$ and $R_2$ and X have the same meanings as already defined, and wherein A represents hydrogen or an alkyl group, $R_3$ and $R_4$ each represents hydrogen, an alkyl group, or the group

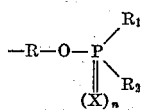

$R_5$ represents hydrogen or a phenyl group, and $X^1$ represents an acid radical. Specifically, in the above formula, each A may be hydrogen, a methyl group, an ethyl group, a butyl group, R may be a methylene group, an ethylene group, a propylene group and the like, $R_1$ and $R_2$ each may be an amino group, a methylamino group, an ethylamino group, a propylamino group, a β-methoxyethylamino group, a methoxy group, an ethoxy group, a butoxy group, a hydroxyl group and its alkali metal salts such as sodium, potassium, calcium and the like, $R_3$ and $R_4$ each may be hydrogen, a methyl group, an ethyl group, a propyl group, a butyl group, a cetyl group, $R_5$ may be hydrogen, an unsubstituted phenyl group or a phenyl group substituted by simple monovalent substituents such as a methyl group, a methoxy group, a nitro group, a sulfonic acid group, a halogen such as chlorine or bromine, a sulfonamide group or a sulfonalkylamide group, and $X^1$ may be a halogen such as chlorine, bromine or iodine, a chlorate radical, a sulfate radical, a toluene sulfonic acid radical and other similar kind of radicals.

We have found that the above described diaminoacridine compounds constitute a valuable series of new dyes which are suitable for coloring textile materials such as threads, yarns, fabrics and staple fibers, but more particularly as coloring agents for cellulose acetate. The colors obtained on cellulose acetate, silk, wool and mordanted cottons are rich orange in color and display considerable resistance to fading and bleaching on exposure to light and atmospheric conditions. The water-soluble feature of our new dyes make it possible to use them with advantage in photographic backing compositions.

It is an object of our invention, therefore, to prepare the dyes above described and to color textile materials, and to prepare photographic backing layers, therewith.

Our new acridine dyes may be prepared by starting with a 3,6-diaminoacridine, condensing it with an alkylene oxide such as ethylene oxide, propylene oxide, epichlorhydrin and the like, and then treating the alcohol derivative thus obtained with from one to four molar equivalents of a phosphating compound such as phosphorus trichloride, phosphorus sulfochloride, phosphorus oxychloride, methoxy phosphorus oxydichloride, dimethoxyethoxy phosphorus oxymonochloride, diethylamino phosphorus oxychloride and other similar kind of phosphating compounds, after which the reaction product is hydrolyzed in water, and the dye isolated by a salting out process. An alternative method of preparing our new acridine compounds is to condense one molar equivalent of an organic aldehyde such as formaldehyde, benzaldehyde, and the like, with two molar equivalents of a m-amino-ω-hydroxyalkylaniline in the presence of a catalyst such as hydrochloric acid, the reaction mixture being dissolved in a reaction medium such as alcohol. After the reaction is complete, the product is oxidized with a compound such as ferric chloride, then phosphated with phosphorus compounds of the type already mentioned, and the dye recovered as previously described. The phosphating intermediates may be prepared as described in Mc- Nally and Dickey U. S. Patent No. 2,183,998, Dec. 19, 1939.

The following examples further illustrate the preparation of our new compounds and their application.

*Example 1*

1 mole of 3,6-diaminoacridine chlorhydrate is heated with an excess of ethylene oxide in the presence of a catalyst such as acetic acid or sulfuric acid, the compound obtained having the formula:

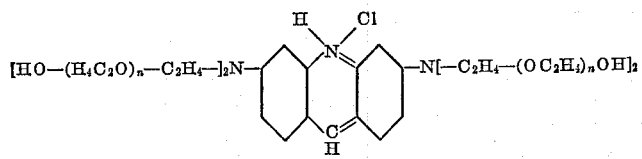

wherein $n$ represents zero or a whole number not greater than 10. The above compound is then dissolved in pyridine and treated, for example, with four molar equivalents of phosphorus oxychloride. The reaction is completed by warming the mixture to 60° C., after which the remaining halogen atoms attached to the phosphorus atom are hydrolyzed with water and the dye salted out. The dye compound obtained has the formula:

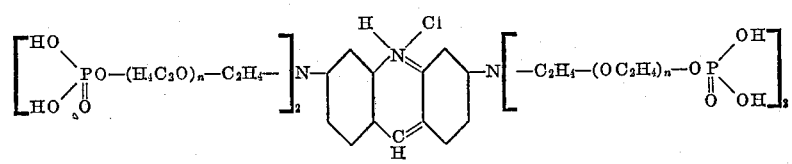

and colors cellulose acetate, silk and mordanted cotton orange shades from an aqueous solution which may contain salt. When less than four molar equivalents of phosphorus oxychloride are employed, there are obtained the corresponding mono-, di- or tri-esters of phosphorus.

If the phosphorus oxychloride is substituted in the above example by an equivalent amount of some other phosphating compound such as phosphorus sulfochloride, methoxy phosphorus oxydichloride, di-methoxyethoxy phosphorus oxymonochloride, diethylamino phosphorus oxydichloride, diethylamino phosphorus oxydichloride, and other similar kind of compounds, there is obtained the corresponding derivatives of acridine.

If desired, any inorganic basic metal salt such as sodium, potassium, calcium, and the like, or a nitrogen containing basic group such as an ammonium group, or the salt of an organic amine can be prepared.

*Example 2*

1 mole of 3,6-diaminoacridine chlorhydrate is heated with ethylene oxide at 180° C. for a period of about 6 hours, and the product thus obtained is then reacted with 2 moles of phenoxy phosphorus dichloride following in general the procedure of Example 1. The dye thus obtained has the formula:

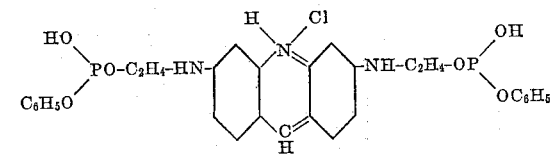

and colors cellulose esters, silk and wool orange shades from an aqueous solution or suspension of the dye. In place of phenoxy phosphorus dichloride, there may be substituted phosphorus trichloride, and various alkoxy and amino substituted derivatives of phosphorus trichloride to give the corresponding acridine acid esters of phosphorus.

*Example 3*

A mixture of 1 mole of benzaldehyde, 2 moles of m-amino-ethyl-β-hydroxyethyl-aniline and 240 grams of 30% hydrochloric acid is heated in an alcoholic solution until a sample dissolves completely in water. The reaction mixture is diluted, neutralized, the solid filtered out and then treated several hours with 90 grams of 10% hydrochloric acid in an autoclave at 150° C. The mixture is cooled, dissolved in dilute hydrochloric acid and oxidized with ferric chloride. The dye thus obtained is phosphated with phosphorus oxychloride in pyridine and recovered as previously described in Example 1. The dye has the formula:

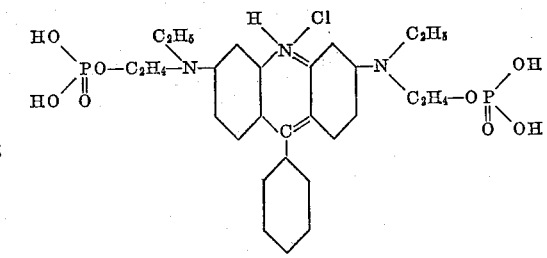

and colors cellulose acetate and mordanted cotton orange shades from an aqueous solution which may contain salt.

Since our new phosphated diaminoacridine compounds are water-soluble, they can ordinarily be applied as dyes directly from their aqueous solutions without the necessity of employing a dispersing agent. The dyeing operation can be carried out in general as follows:

2.5 parts by weight of the dye, prepared according to any of the examples, are dissolved in 230 parts of water and the mixture heated to about 80–85° C., at which point it is maintained throughout the entire dyeing operation. Then 100 parts of a textile material such as cellulose acetate in the form of a fiber, yarn or fabric are immersed in the dye solution and worked until the desired shade and condition of color has been acquired. Salt may be added during the dyeing operation to promote exhaustion of the dye bath. The material is then removed from the bath, washed with soap, rinsed and dried. It will be colored an orange shade.

While our invention is illustrated more particularly with cellulose acetate as representing the organic derivatives of cellulose, it will be understood that our new dye compounds are likewise applicable to other organic derivatives of cellulose including both the hydrolyzed as well as the unhydrolyzed organic acid esters of cellulose such as cellulose formate, cellulose acetate, cellulose propionate, cellulose butyrate, cellulose phthalate, and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, and benzyl cellulose.

We claim:

1. The 3,6-diaminoacridine compounds having at least one of the amino group hydrogens substituted by a group having the general formula:

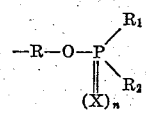

wherein $n$ is selected from the group consisting of zero and the numeral 1, R represents an alkylene group, $R_1$ and $R_2$ each represents a member selected from the group consisting of an amino group, an alkylamino group, and the group —OZ, wherein Z represents a member selected from the group consisting of hydrogen, an alkyl group, and an alkali forming metal, and X represents a member selected from the group consisting of an atom of oxygen, and an atom of sulphur.

2. The 3,6-diaminoacridine compounds having at least one of the amino group hydrogens substituted by a group having the general formula:

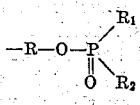

wherein R represents an alkylene group, and $R_1$ and $R_2$ each represents a member selected from the group consisting of an amino group, an alkylamino group, and the group —OZ, wherein Z represents a member selected from the group consisting of hydrogen, an alkyl group, and an alkali forming metal.

3. The 3,6-diaminoacridine compounds having at least one of the amino group hydrogens substituted by a group having the general formula:

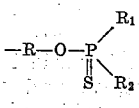

wherein R represents an alkylene group, and $R_1$ and $R_2$ each represents a member selected from the group consisting of an amino group, an alkylamino group, and the group —OZ, wherein Z represents a member selected from the group consisting of hydrogen, an alkyl group, and an alkali forming metal.

4. The 3,6-diaminoacridine compounds having at least one of the amino group hydrogens substituted by a group having the general formula:

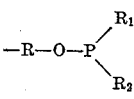

wherein R represents an alkylene group, and $R_1$ and $R_2$ each represents a member selected from the group consisting of an amino group, an alkylamino group, and the group —OZ, wherein Z represents a member selected from the group consisting of hydrogen, an alkyl group, and an alkali forming metal.

5. The acridine compounds having the general formula:

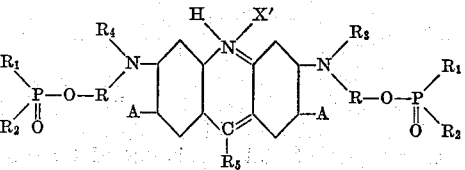

wherein each A represents a member selected from the group consisting of hydrogen, and an alkyl group, R represents an alkylene group, $R_1$ and $R_2$ each represents a member selected from the group consisting of an amino group, an alkylamino group, and the group —OZ, wherein Z represents a member selected from the group consisting of hydrogen, an alkyl group, and an alkali forming metal, $R_3$ and $R_4$ each represents a member selected from the group consisting of hydrogen, an alkyl group, and the group

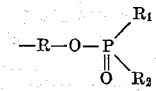

$R_5$ represents a member selected from the group consisting of hydrogen and a phenyl nucleus, and X' represents an acid radical.

6. The acridine compounds having the general formula:

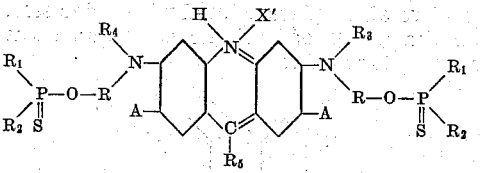

wherein each A represents a member selected from the group consisting of hydrogen, an alkyl group, R represents an alkylene group, $R_1$ and $R_2$ each represents a member selected from the group consisting of an amino group, an alkylamino group, and the group —OZ, wherein Z represents a member selected from the group consisting of hydrogen, an alkyl group, and an alkali forming metal, $R_3$ and $R_4$ each represents a member selected from the group consisting of hydrogen, an alkyl group, and the group

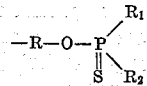

$R_5$ represents a member selected from the group consisting of hydrogen and a phenyl nucleus, and X' represents an acid radical.

7. The acridine compounds having the general formula:

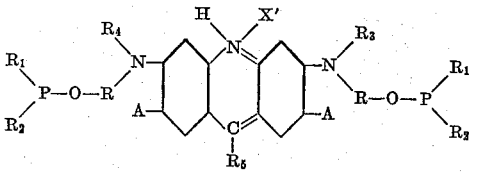

wherein each A represents a member selected from the group consisting of hydrogen, and an alkyl group, R represents an alkylene group, $R_1$ and $R_2$ each represents a member selected from the group consisting of an amino group, an alkylamino group, and the group —OZ, wherein Z represents a member selected from the group consisting of hydrogen, an alkyl group, and an alkali forming metal, $R_3$ and $R_4$ each represents a member selected from the group consisting of hydrogen, an alkyl group, and the group

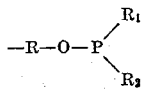

$R_5$ represents a member selected from the group consisting of hydrogen and a phenyl nucleus, and $X'$ represents an acid radical.

8. A textile material consisting of an organic derivative of cellulose colored with a dye selected from the group of 3,6-diaminoacridine compounds having at least one of the amino group hydrogens substituted by a group having the general formula:

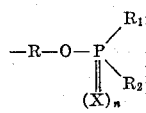

wherein $n$ is selected from the group consisting of zero and the numeral 1, R represents an alkylene group, $R_1$ and $R_2$ each represents a member selected from the group consisting of an amino group, an alkylamino group, and the group —OZ, wherein Z represents a member selected from the group consisting of hydrogen, an alkyl group, and an alkali forming metal, and X represents a member selected from the group consisting of an atom of oxygen, and an atom of sulphur.

9. A textile material consisting of an organic derivative of cellulose colored with a dye selected from the group of acridine compounds having the general formula:

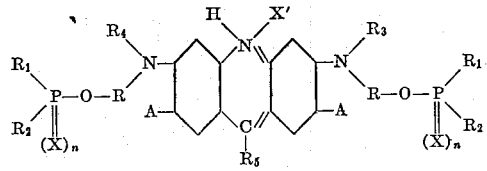

wherein each A represents a member selected from the group consisting of hydrogen, and an alkyl group, $n$ represents zero or the numeral 1, R represents an alkylene group, $R_1$ and $R_2$ each represents a member selected from the group consisting of an amino group, an alkylamino group, and the group —OZ, wherein Z represents a member selected from the group consisting of hydrogen, an alkyl group, and an alkali forming metal, $R_3$ and $R_4$ each represents a member selected from the group consisting of hydrogen, an alkyl group, and the group

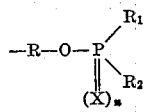

$R_5$ represents a member selected from the group consisting of hydrogen, and a phenyl nucleus, and $X'$ represents an acid radical.

10. A textile material consisting of cellulose acetate colored with a dye selected from the group of 3,6-diaminoacridine compounds having at least one of the amino group hydrogens substituted by a group having the general formula:

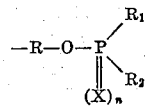

wherein $n$ is selected from the group consisting of zero and the numeral 1, R represents an alkylene group, $R_1$ and $R_2$ each represents a member selected from the group consisting of an amino group, an alkylamino group, and the group —OZ, wherein Z represents a member selected from the group consisting of hydrogen, an alkyl group, and an alkali forming metal, and X represents a member selected from the group consisting of an atom of oxygen, and an atom of sulphur.

11. A textile material consisting of cellulose acetate colored with a dye selected from the group of acridine compounds having the general formula:

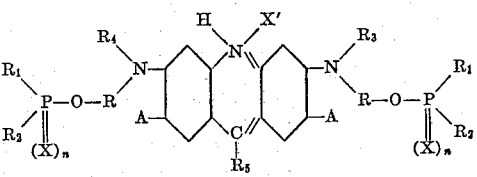

wherein each A represents a member selected from the group consisting of hydrogen, and an alkyl group, $n$ is selected from the group consisting of zero and the numeral 1, R represents an alkylene group, $R_1$ and $R_2$ each represents a member selected from the group consisting of an amino group, an alkylamino group, and the group —OZ, wherein Z represents a member selected from the group consisting of hydrogen, an alkyl group, and an alkali forming metal, $R_3$ and $R_4$ each represents a member selected from the group consisting of hydrogen, an alkyl group, and the group

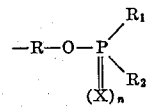

$R_5$ represents a member selected from the group consisting of hydrogen, and a phenyl nucleus, and $X'$ represents an acid radical.

JAMES G. McNALLY.
JOSEPH B. DICKEY.